(12) United States Patent
Kono et al.

(10) Patent No.: US 10,725,241 B2
(45) Date of Patent: Jul. 28, 2020

(54) ASYMMETRICAL SPOT-SIZE CONVERTER AND METHOD OF MANUFACTURING SPOT-SIZE CONVERTER

(71) Applicant: SUMITOMO ELECTRIC INDUSTRIES, LTD., Osaka (JP)

(72) Inventors: Naoya Kono, Osaka (JP); Takuo Hiratani, Osaka (JP); Masataka Watanabe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/445,627

(22) Filed: Jun. 19, 2019

(65) Prior Publication Data

US 2019/0391332 A1 Dec. 26, 2019

(30) Foreign Application Priority Data

Jun. 26, 2018 (JP) ................................ 2018-120673

(51) Int. Cl.
*G02B 6/122* (2006.01)
*G02B 6/30* (2006.01)
*G02B 6/14* (2006.01)
*G02B 6/036* (2006.01)

(52) U.S. Cl.
CPC ........... *G02B 6/1228* (2013.01); *G02B 6/036* (2013.01); *G02B 6/14* (2013.01); *G02B 6/305* (2013.01)

(58) Field of Classification Search
CPC ........ G02B 6/1228; G02B 6/036; G02B 6/14; G02B 6/305
See application file for complete search history.

(56) References Cited

U.S. PATENT DOCUMENTS

| | | | | |
|---|---|---|---|---|
| 9,176,360 | B2* | 11/2015 | Yagi | G02B 6/1228 |
| 9,435,950 | B2* | 9/2016 | Kono | G02F 1/025 |
| 2015/0024527 | A1* | 1/2015 | Yagi | G02B 6/1228 |
| | | | | 438/31 |
| 2016/0025922 | A1* | 1/2016 | Kono | G02F 1/025 |
| | | | | 385/2 |
| 2017/0207600 | A1* | 7/2017 | Klamkin | H01S 5/02292 |
| 2019/0391332 | A1* | 12/2019 | Kono | G02B 6/1228 |

OTHER PUBLICATIONS

Jaime Cardenas et al., High Coupling Efficiency Etched Facet Tapers in Silicon Waveguides, *IEEE Photonics Technology Letters*, vol. 26, No. 23, pp. 2380-2382, Dec. 1, 2014.

* cited by examiner

*Primary Examiner* — Andrew Jordan
(74) *Attorney, Agent, or Firm* — Smith, Gambrell & Russell, LLP.

(57) ABSTRACT

A spot-size converter includes: a support body that includes a main surface including a first to a fifth areas; a mesa structure that includes a first part on the first area and includes a second part on the second to the fourth areas; and an embedding structure that includes a first region and a second region in which a first and a second side-surfaces of the second part of the mesa structure are respectively embedded. The second part of the mesa structure includes a portion that has a width gradually decreasing in a direction from the third area toward the fifth area. The first region of the embedding structure extends along the first side-surface and terminates at one of the third and the fourth areas. The second region of the embedding structure extends along the second side-surface of the second part and is disposed on the fifth area.

6 Claims, 12 Drawing Sheets

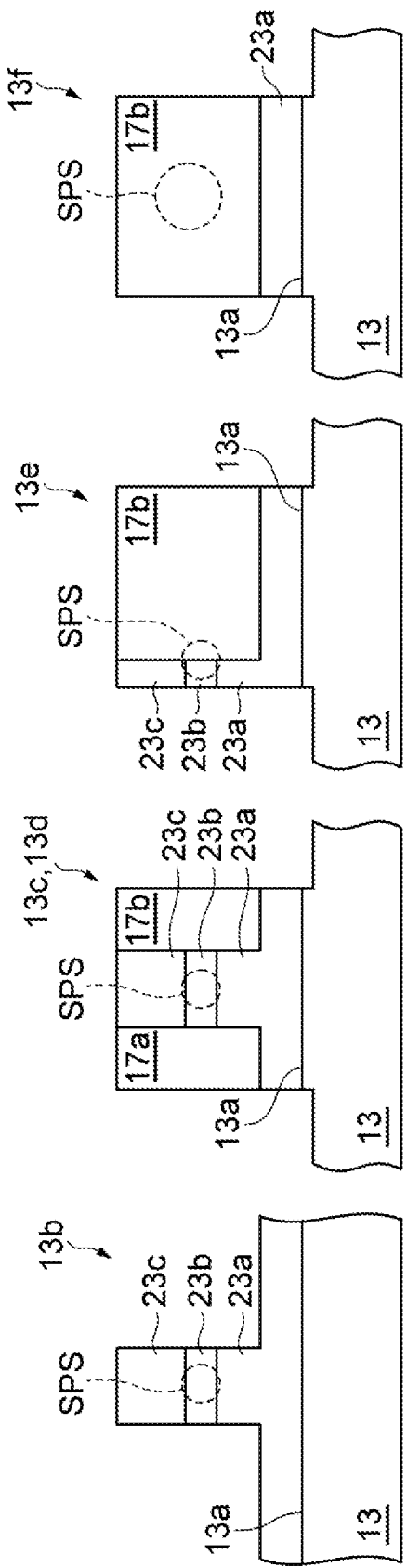

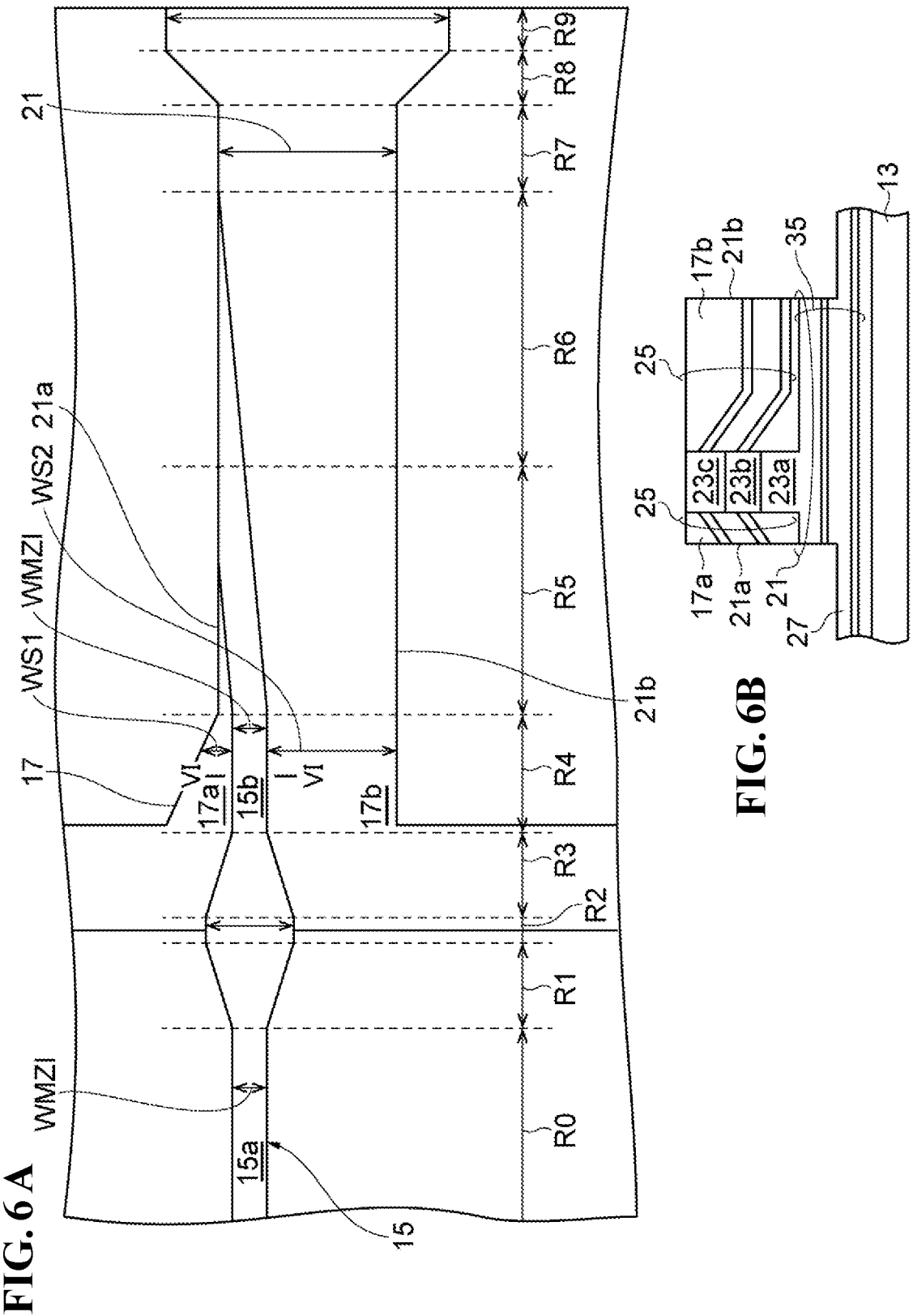

ASYMMETRICAL SPOT-SIZE CONVERTER AND METHOD OF MANUFACTURING SPOT-SIZE CONVERTER

BACKGROUND OF THE INVENTION

1. Field of the Invention

The present invention relates to a spot-size converter.

2. Description of the Related Art

Non-Patent Document 1, "High Coupling Efficiency Etched Facet Tapers in Silicon Waveguides" Jaime Cardenas, Carl B. Poitras, Kevin Luke, Lian Wee Luo, Paul Adrian Morton, and Michal Lipson, IEEE PHOTONICS TECHNOLOGY LETTERS, VOL. 26, NO. 23, Dec. 1, 2014, discloses a spot-size converter made of silicon and in which the width of an end portion of a waveguide is narrowed to 160 nm.

SUMMARY OF THE INVENTION

The spot-size converter of Non-Patent Document 1 requires an end portion of a waveguide to have a width of 160 nm. A fine waveguide end in a spot-size converter requires an advanced processing technique for manufacturing the spot-size converter and may cause characteristic variations due to dimensional variations.

One aspect of the present invention is to provide a spot-size converter that enables a change in a mode field diameter by an optical transition in a lateral direction. Another aspect of the present invention is to provide a method of manufacturing the spot-size converter.

A spot-size converter according to one aspect of the present invention includes a support body that includes a main surface including a first area, a second area, a third area, a fourth area, and a fifth area that are arranged in a direction of a waveguide axis; a first mesa structure that includes a first part on the first area of the support body and includes a second part on the second area, the third area, and the fourth area of the support body; and an embedding structure that includes a first region and a second region in which a first side-surface and a second side-surface of the second part of the first mesa structure are respectively embedded and that is disposed at the second area, the third area, the fourth area, and the fifth area of the support body. The first part and the second part of the first mesa structure include a lower cladding region, a core region, and an upper cladding region. The second part of the first mesa structure includes, at the fourth area of the support body, a portion that has a width gradually decreasing in a direction from the third area toward the fifth area. The first region of the embedding structure extends along the first side-surface of the second part of the first mesa structure and terminates at one of the third area and the fourth area. The second region of the embedding structure extends along the second side-surface of the second part of the first mesa structure and is disposed at the fifth area.

A method of manufacturing a spot-size converter according to another aspect of the present invention includes a step of preparing a first product that includes a substrate and that includes, on the substrate, a lamination structure for a waveguide structure, the substrate including a main surface that includes a first area, a second area, a third area, a fourth area, and a fifth area that are arranged at one element section in a direction of a waveguide axis; a step of forming a first mask on the first product, the first mask including a stripe pattern; a step of forming a second product by etching the first product with use of the first mask, the second product including a stripe mesa on the first area, the second area, the third area, and the fourth area; a step of forming a second mask on the second product, the second mask covering the first area; a step of forming a third product by forming a deposit with use of the first mask and the second mask, the deposit including a first region and a second region that form a respective one of a first interface and a second interface on a first side-surface and a second side-surface of the stripe mesa of the second product, respectively; a step of removing the first mask and the second mask after forming the deposit; a step of forming a third mask on the third product, the third mask including a first opening and a second opening that is away from the first opening, the first opening intersecting the first interface and the second interface; and a step of forming a mesa structure and an embedding structure by etching the third product with use of the third mask. The mesa structure includes a first part at the first area and includes a second part at the second area, the third area, and the fourth area of the substrate. The embedding structure includes a first region and a second region in which a first side-surface and a second side-surface of the second part of the mesa structure are respectively embedded. The embedding structure is disposed at the second area, the third area, the fourth area, and the fifth area of the substrate.

The aforementioned objects and other objects, features, and advantages of the present invention becomes clear more easily from the following detailed description of a suitable embodiment of the present invention provided with reference to the attached drawings.

BRIEF DESCRIPTION OF THE DRAWINGS

FIG. 4A, FIG. 4B, FIG. 4C, and FIG. 4D schematically illustrate a transition of light and a conversion of a spot size in the spot-size converter according to the present embodiment.

FIG. 6A and FIG. 6B are a plan view schematically illustrating a spot-size converter according to an example and a sectional view schematically illustrating a second mesa structure in the spot-size converter, respectively.

DESCRIPTION OF THE PREFERRED EMBODIMENTS

Figure 1:
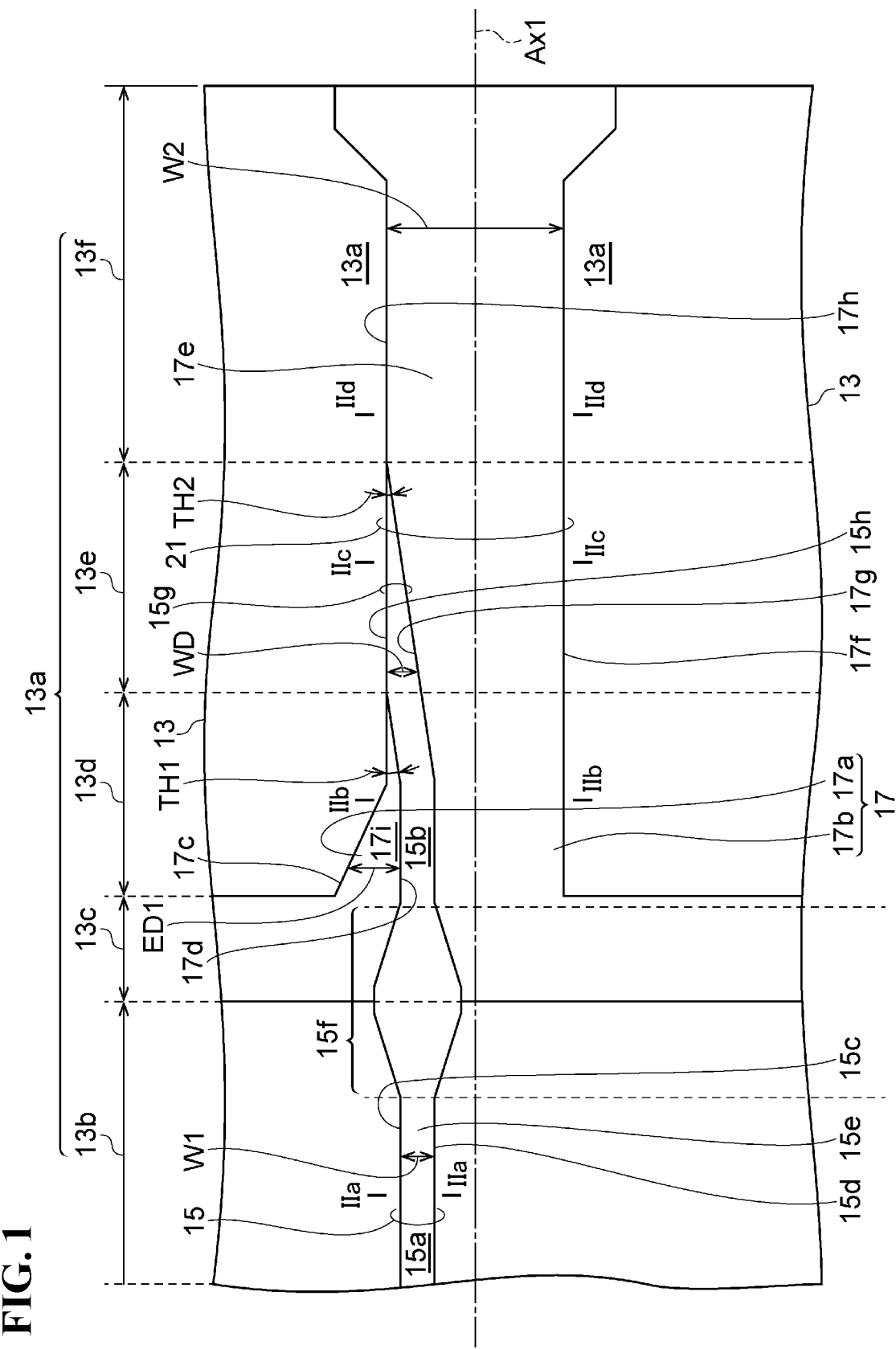
FIG. 1 is a plan view illustrating a spot-size converter according to the present embodiment.
Figure 2:
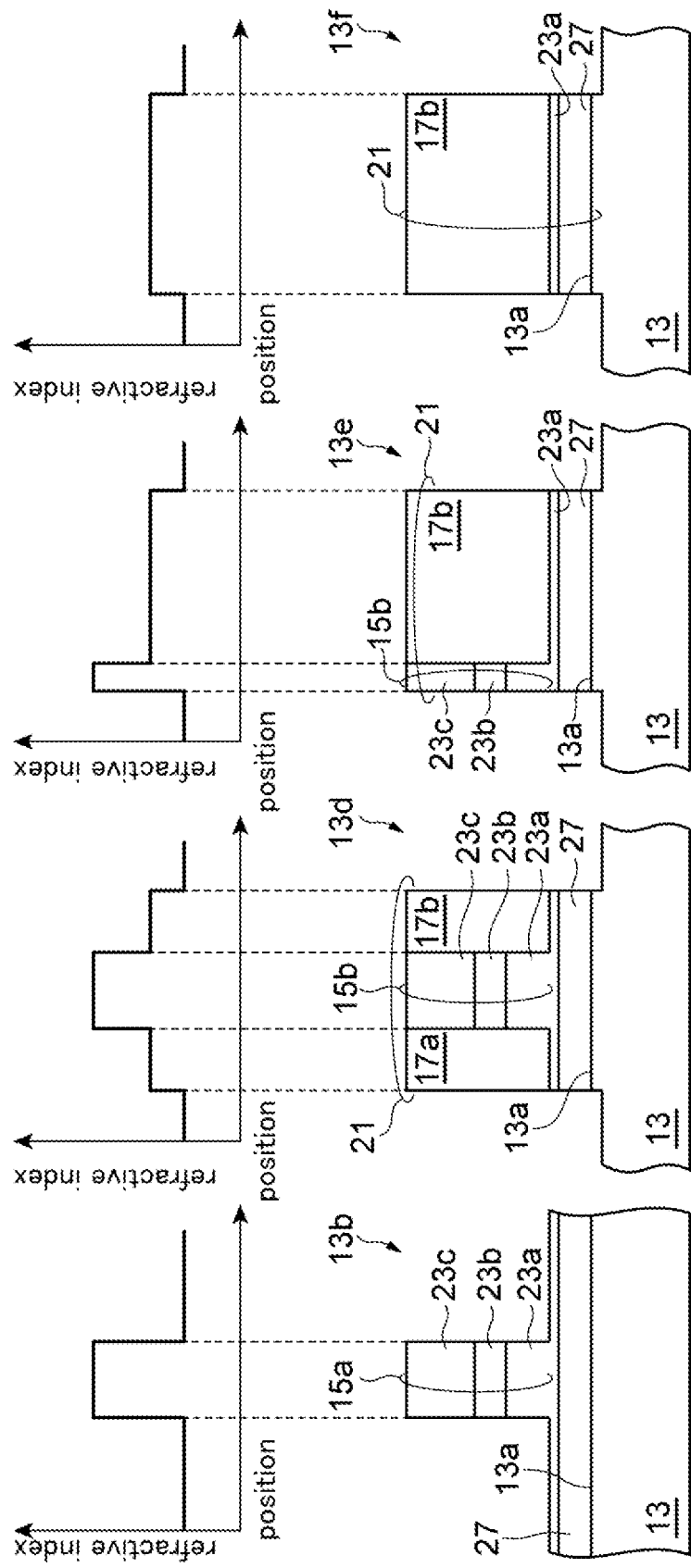
FIG. 2A, FIG. 2B, FIG. 2C, and FIG. 2D each illustrate a cross section taken along line IIa-IIa, line IIb-IIb, line IIc-IIc, or line IId-IId illustrated in FIG. 1 and refractive index distribution.

Some specific examples will be described.

A spot-size converter according to a specific example includes (a) a support body that includes a main surface including a first area, a second area, a third area, a fourth area, and a fifth area that are arranged in a direction of a waveguide axis, (b) a first mesa structure that includes a first part at the first area of the support body and a second part at the second area, the third area, and the fourth area of the support body, and (c) an embedding structure that includes a first region and a second region in which a first side-surface and a second side-surface of the second part of the first mesa structure are respectively embedded and that is disposed at the second area, the third area, the fourth area, and the fifth area of the support body. The first part and the second part of the first mesa structure include a lower cladding region, a core region, and an upper cladding region. The second part of the first mesa structure includes, at the fourth area of the support body, a portion that has a width gradually decreasing in a direction from the third area toward the fifth area. The first region of the embedding structure extends along the first side-surface of the second part of the first mesa structure and terminates at one of the third area and the fourth area. The second region of the embedding structure extends along the second side-surface of the second part of the first mesa structure and is disposed at the fifth area.

According to the spot-size converter, the first region of the embedding structure extends along the first side-surface of the second part of the first mesa structure and terminates at one of the third area and the fourth area, and the second part of the first mesa structure includes, at the fourth area, the portion that has the width gradually decreasing in the direction of the waveguide axis. The termination of the first region of the embedding structure and the decrease in the width of the first mesa structure enable conversion of the spot size of light that propagates through the embedding structure and the first mesa structure.

In the spot-size converter according to the specific example, the embedding structure includes a lamination of a plurality of semiconductor layers laminated so as to have a refractive index that is larger than the refractive index of the upper cladding region and that is smaller than the refractive index of the core region.

According to the spot-size converter, the embedding structure having the refractive index larger than the refractive index of the upper cladding region and smaller than the refractive index of the core region enables light to shift easily from one to the other of the embedding structure and the first mesa structure.

In the spot-size converter according to the specific example, the first part of the first mesa structure has, at the first area of the support body, a first width that enables single-mode waveguiding, and the second region of the embedding structure has a width larger than the first width at the third area, the fourth area, and the fifth area of the support body.

According to the spot-size converter, the embedding structure is provided, at the fourth area and the fifth area, with the second region that has the width larger than the first width of the first part of the first mesa structure, which enables light to shift easily from one to the other of the second part of the first mesa structure and the embedding structure.

In the spot-size converter according to the specific example, the first region of the embedding structure includes, at at least one of the third area and the fourth area, a portion that has a width gradually decreasing in the direction of the waveguide axis.

According to the spot-size converter, the first region of the embedding structure is provided with the portion that has the width gradually decreasing in the direction of the waveguide axis, which enables light to shift easily from one to the other of the second part of the first mesa structure and the embedding structure.

The spot-size converter according to the specific example further includes a confining region disposed on the main surface of the support body. The mesa structure and the embedding structure are loaded on the confining region. The confining region has a refractive index that is larger than the refractive index of the upper cladding region and that is smaller than the refractive index of the core region.

According to the spot-size converter, the confining region is provided with the refractive index larger than the refractive index of the upper cladding region and smaller than the refractive index of the core region, which enables the mode field diameter to be increased in a vertical direction.

A method of manufacturing the spot-size converter according to the specific example includes (a) a step of preparing a first product that includes a substrate and that includes, on the substrate, a lamination structure for a waveguide structure, the substrate including a main surface that includes a first area, a second area, a third area, a fourth area, and a fifth area that are arranged in one element section in the direction of a waveguide axis, (b) a step of forming, on the first product, a first mask that includes a stripe pattern, (c) a step of forming a second product by etching the first product with use of the first mask, the second product including a stripe mesa on the first area, the second area, the third area, and the fourth area, (d) step of forming a second mask on the second product, the second mask covering the first area, (e) a step of forming a third product by forming a deposit with use of the first mask and the second mask, the deposit including a first region and a second region that form a respective one of a first interface and a second interface on a first side-surface and a second side-surface of the stripe mesa of the second product, respectively, (f) a step of removing the first mask and the second mask after forming the deposit, (g) a step of forming, on the third product, a third mask that includes a first opening and a second opening that is away from the first opening, the first opening intersecting the first interface and the second interface, and (h) a step of forming a mesa structure and a embedding structure by etching the third product with use of the third mask. The mesa structure includes a first part at the first area and a second part at the second area, the third area, and the fourth area of the substrate. The embedding structure includes a first region and a second region in which a first side-surface and a second side-surface of the second part of the mesa structure are respectively embedded. The embedding structure is disposed at the second area, the third area, the fourth area, and the fifth area of the substrate.

According to the method of manufacturing the spot-size converter, the third product is formed, the third product including the stripe mesa and the deposit that includes the first region and the second region forming the respective one of the first interface and the second interface on the first side-surface and the second side-surface of the stripe mesa, respectively, and the third product is etched using the third mask that includes the first opening and the second opening that is away from the first opening, the first opening intersecting the first interface and the second interface of the third product. The third product enables the second part of the mesa structure to include, at the fourth area, a portion having a width gradually decreasing in the direction of the waveguide axis. The second part of the first mesa structure terminates at the third area or the fourth area. The first region of the embedding structure extends along the first side-surface of the second part of the mesa structure and terminates at the third area. The second region of the embedding structure extends along the second side-surface of the second part of the first mesa structure and is disposed at the fifth area.

Knowledge of the present invention is easily understood by referring to the attached drawings presented as examples and considering the following detailed description. Next, with reference to the attached drawings, embodiments of the spot-size converter and the method of manufacturing the spot-size converter will be described. Components identical to each other are given an identical reference sign, if possible.

FIG. 1 is a plan view illustrating a spot-size converter according to the present embodiment. A spot-size converter 11 includes a support body 13, a first mesa structure 15, and an embedding structure 17.

The support body 13 includes a main surface 13a, and the main surface 13a includes a first area 13b, a second area 13c, a third area 13d, a fourth area 13e, and a fifth area 13f. The first area 13b, the second area 13c, the third area 13d, the fourth area 13e, and the fifth area 13f are arranged in the direction of a waveguide axis Ax1.

The first mesa structure 15 includes a first part 15a and a second part 15b. The first part 15a is disposed on the first area 13b of the support body 13. The second part 15b is disposed on the second area 13c, the third area 13d, and the fourth area 13e of the support body 13. The first mesa structure 15 includes a first side-surface 15c, a second side-surface 15d, and an upper surface 15e.

If necessary, the first mesa structure 15 includes a third part 15f. Specifically, the third part 15f is disposed between the first part 15a and the second part 15b and may include two tapered portions that connect the first area 13b and the third area 13d to each other.

In the present embodiment, a portion 15g of the second part 15b of the first mesa structure 15 is disposed at the fourth area 13e.

The embedding structure 17 is disposed on the second area 13c, the third area 13d, the fourth area 13e, and the fifth area 13f of the support body 13 and is not disposed on the first area 13b of the support body 13. The embedding structure 17 includes a first region 17a and a second region 17b. The first side-surface 15c and the second side-surface 15d of the second part 15b of the first mesa structure 15 are embedded in the first region 17a and the second region 17b, respectively. The embedding structure 17 includes a first outer surface 17c, an upper surface 17e, and a second outer surface 17f. In the present embodiment, the upper surface 17e of the embedding structure 17 is substantially level with the upper surface 15e of the first mesa structure 15.

The first region 17a of the embedding structure 17 extends along the first side-surface 15c of the second part 15b of the first mesa structure 15 and terminates at one of the third area 13d and the fourth area 13e. In the present embodiment, the first region 17a of the embedding structure 17 terminates at a border between the third area 13d and the fourth area 13e. The second region 17b of the embedding structure 17 extends along the second side-surface 15d of the second part 15b of the first mesa structure 15 on the fourth area 13e, and is disposed on the fifth area 13f where the first mesa structure 15 is not disposed on.

According to the spot-size converter 11, the first region 17a of the embedding structure 17 extends along the first side-surface 15c of the second part 15b of the first mesa structure 15 and terminates at one of the third area 13d and the fourth area 13e. The second part 15b of the first mesa structure 15 includes, on the fourth area 13e, the portion 15g that has a width WD gradually decreasing in the direction of the waveguide axis Ax1. The termination of the first region 17a of the embedding structure 17 and the decrease of the width WD of the first mesa structure 15 enable conversion of the spot size of light that propagates through the embedding structure 17 and the first mesa structure 15.

In the present embodiment, the second part 15b of the first mesa structure 15 and the embedding structure 17 form a second mesa structure 21.

In the present embodiment, the first region 17a of the embedding structure 17 includes the first outer surface 17c and a first inner surface 17d, and the first region 17a extends along the first side-surface 15c of the second part 15b of the first mesa structure 15. The first inner surface 17d joins with the first side-surface 15c of the second part 15b of the first mesa structure 15.

The first region 17a includes, at at least one of the third area 13d and the fourth area 13e, a portion 17i that has a width ED1 gradually decreasing in the direction of the waveguide axis Ax1. Due to the first region 17a being provided with the narrow-width portion, the first region 17a on the first side-surface 15c and the second region 17b on the second side-surface 15d are asymmetrical in the lateral direction. The asymmetry of the embedding structure 17 enables light to shift from one to the other of the second part 15b of the first mesa structure 15 and the second region 17b of the embedding structure 17.

The first region 17a terminates at one of the third area 13d and the fourth area 13e. Due to the termination of the first region 17a, the first mesa structure 15 loses the embedding structure 17 extending adjacent to one side thereof. The disappearance of the embedding structure 17 enables light to shift easily from one to the other of the second part 15b of the first mesa structure 15 and the second region 17b of the embedding structure 17.

If possible, the first outer surface 17c meets, at a terminal portion of the second part 15b of the first mesa structure 15, the first side-surface 15c with an acute angle TH1 formed therebetween. The acute angle TH1 may be within the range of, for example, 0.1 degrees to 2 degrees.

In the present embodiment, the second region 17b of the embedding structure 17 includes the second outer surface 17f and a second inner surface 17g, and the second part 15b of the first mesa structure 15 extends along the second region 17b. The second inner surface 17g joins with the second side-surface 15d of the second part 15b of the first mesa structure 15.

In the first mesa structure 15, the portion 15g of the second part 15b has a gradually decreasing width on the fourth area 13e. The portion 15g of the second part 15b has a smallest width. In the present embodiment, the smallest width is 0.4 micrometers or less.

The second part 15b of the first mesa structure 15 preferably terminates at the fourth area 13e. As a result of the termination of the second part 15b, the second inner surface 17g of the second region 17b of the embedding structure 17 terminates. As a result of the termination of the second inner surface 17g, a third outer surface 17h is provided. The third outer surface 17h is opposite to the second outer surface 17f. On the fifth area 13f, the second mesa structure 21 does not include the first mesa structure 15. At the second region 17b of the embedding structure 17 on the fifth area 13f, the second part 15b of the first mesa structure 15 includes a terminal surface 15h that connects the first outer surface 17c to the third outer surface 17h. If possible, the second inner surface 17g meets, at the second part 15b of the first mesa structure 15, the terminal surface 15h with an acute angle TH2 formed therebetween. The acute angle TH2 may be within the range of, for example, 0.1 degrees to 2 degrees.

The first region 17a of the embedding structure 17 and the second part 15b of the first mesa structure 15 include respective acute angle ends. Manufacture of the spot-size converter 11, however, does not require fine photolithography or fine etching to form these acute angle ends.

At the first area 13b of the support body 13, the first part 15a of the first mesa structure 15 has a first width W1 that enables single-mode waveguiding.

In the present embodiment, the second region 17b of the embedding structure 17 has a width larger than the first width W1 at the third area 13d, the fourth area 13e, and the fifth area 13f of the support body 13. Specifically, at the fifth area 13f, the second region 17b has a width W2 larger than the first width W1.

In the present embodiment, the second mesa structure 21 is constituted by the second region 17b of the embedding structure 17 on the fifth area 13f. The second mesa structure 21 has the width W2. The second mesa structure 21 that has the large breadth enables waveguiding in the second mesa structure 21 to be stable.

The second mesa structure 21 including the first region 17a, the second region 17b, and the second part 15b of the first mesa structure 15 is higher than the first part 15a of the first mesa structure 15. The second mesa structure 21 is deeper than the first mesa structure 15. The tall second mesa structure 21 is capable of adjusting the mode field diameter in the vertical direction.

The first mesa structure 15 has refractive index distribution in vertical direction, so that optical waveguiding is enabled. The refractive index distribution has a largest value and a smallest value at the first mesa structure 15 in the vertical direction. The largest value of the refractive index is larger than the refractive index or an average refractive index of the embedding structure 17. The smallest value of the refractive index is equal to or smaller than the refractive index or an average refractive index of the embedding structure 17.

FIG. 2A, FIG. 2B, FIG. 2C, and FIG. 2D each illustrate a cross section taken along line IIa-IIa, line IIb-IIb, line IIc-IIc, or line IId-IId illustrated in FIG. 1 and refractive index distribution. The refractive index distribution is taken in the lateral direction at the height of a core region 23b of the first mesa structure 15.

The first part 15a and the second part 15b of the first mesa structure 15 each include a lower cladding region 23a, the core region 23b, and an upper cladding region 23c. The embedding structure 17 has a refractive index or an average refractive index smaller than the refractive index of the core region 23b of the first mesa structure 15. The refractive index of the embedding structure 17 is equal to or larger than the refractive index of the upper cladding region 23c of the first mesa structure 15.

In the spot-size converter 11, the embedding structure 17 that has the refractive index that is larger than the refractive index of the upper cladding region 23c and that is smaller than the refractive index of the core region 23b enables light to shift easily from one to the other of the embedding structure 17 and the first mesa structure 15.

If necessary, the spot-size converter 11 may further include a lower region 27 disposed on the main surface 13a of the support body 13. The first mesa structure 15 and the embedding structure 17 are loaded on the lower region 27. The lower region 27 is capable of providing a refractive index that is equal to or larger than the refractive index of the upper cladding region 23c and that is smaller than the refractive index of the core region 23b.

The embedding structure 17 may include a lamination of a plurality of semiconductor layers laminated so as to have a refractive index that is larger than the refractive index of the upper cladding region 23c and that is smaller than the refractive index of the core region 23b.

Figure 3:
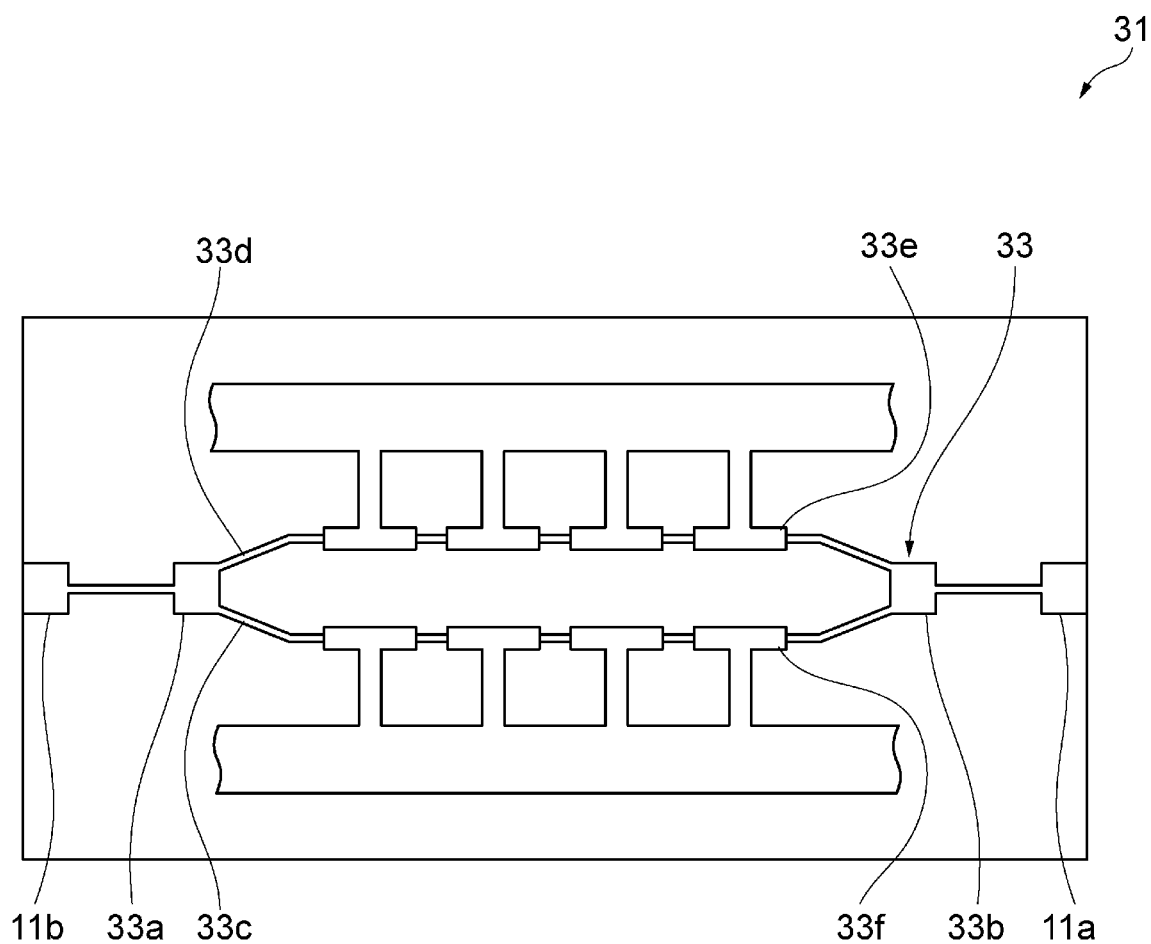
FIG. 3 is a plan view schematically illustrating a semiconductor optical device that includes the spot-size converter according to the present embodiment.

Example of Spot-size Converter 11 made of Semiconductor
Support Body 13: InP
First Mesa Structure 15
Lower Cladding Region 23a: InP
Core Region 23b: AlGaInAs/AlGaInAs Quantum Well Structure
Upper Cladding Region 23c: InP
Embedding Structure 17: InP/InGaAsP Multilayer Film
Lower Region 27: InP FIG. 3 is a plan view schematically illustrating a semiconductor optical device that includes the spot-size converter according to the present embodiment. A semiconductor optical device 31 includes a Mach-Zehnder modulator 33. The spot-size converter 11 (11a, 11b) is connected to each of the input and the output of the Mach-Zehnder modulator 33. The Mach-Zehnder modulator 33 includes a divider 33a, a merger 33b, a first arm waveguide 33c, a first arm waveguide 33d, a first arm electrode 33e, and a second arm electrode 33f.

The first part 15a and the second part 15b of the first mesa structure 15 in the spot-size converter 11 include a semiconductor lamination structure identical to the semiconductor lamination structure at the divider 33a, the merger 33b, the first arm waveguide 33c, and the first arm waveguide 33d. The embedding structure 17 of the spot-size converter 11 is provided by selective growth and etching added to the manufacturing step of the Mach-Zehnder modulator 33.

FIG. 4A, FIG. 4B, FIG. 4C, and FIG. 4D schematically illustrate a transition of light and a conversion of a spot size in the spot-size converter according to the present embodiment. The spot-size converter 11 causes optical transition and spot-size conversion successively, as illustrated in FIG. 4A, FIG. 4B, FIG. 4C, and FIG. 4D, in light that propagates from the first mesa structure 15 on the first area 13b to the second mesa structure 21 on the fifth area 13f. In addition, the spot-size converter 11 causes optical transition and spot size conversion successively, as illustrated in FIG. 4D, FIG. 4C, FIG. 4B, and FIG. 4A, in light that propagates from the second mesa structure 21 on the fifth area 13f to the first mesa structure 15 on the first area 13b. A broken line SPS indicates a center portion of a light beam that propagates through the spot-size converter 11.

EXAMPLE 1

The semiconductor optical device 31 is applicable to an InP-based Mach-Zehnder modulator. The Mach-Zehnder modulator 33 and the spot-size converter 11 are disposed on a main surface of the semiconductor optical device 31. A conversion end of the spot-size converter 11 appears at a side surface of the semiconductor optical device 31. The spot-size converter 11 is capable of reducing an optical coupling loss relating to an optical input and an optical output in the Mach-Zehnder modulator 33.

The Mach-Zehnder modulator includes a tall waveguide region that includes a core region and cladding regions above and below the core region, the core region and the cladding regions greatly differing in terms of refractive index. The waveguide region is effective for improving modulation efficiency of the Mach-Zehnder modulator. According to the knowledge of the inventor, the waveguide region, which is effective in the Mach-Zehnder modulator, is unsuitable for spot-size conversion that uses a narrow-width semiconductor mesa.

Figure 5A:
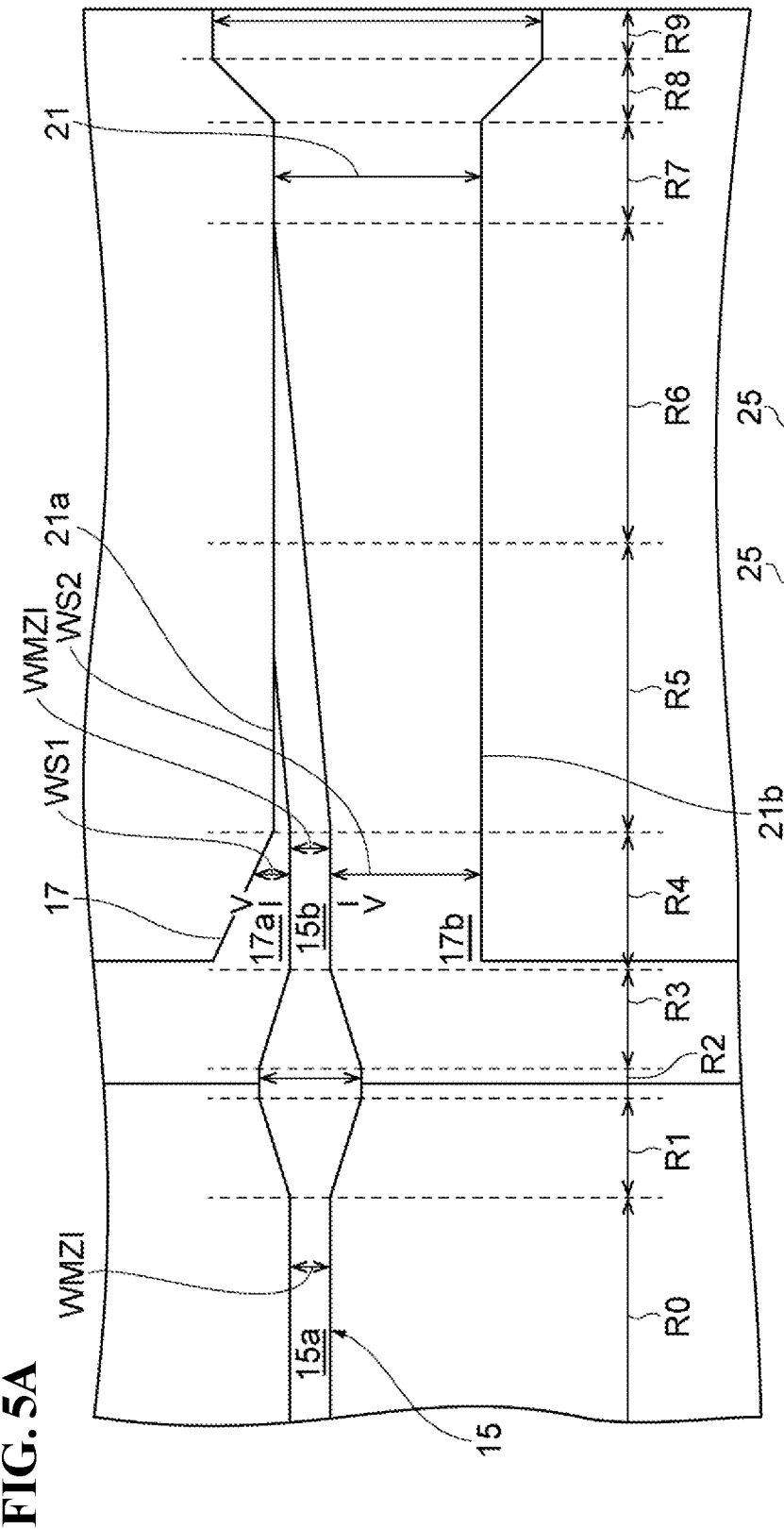
FIG. 5A and FIG. 5B are a plan view schematically illustrating a spot-size converter according to an example and a sectional view schematically illustrating a second mesa structure in the spot-size converter, respectively.
Figure 5B:
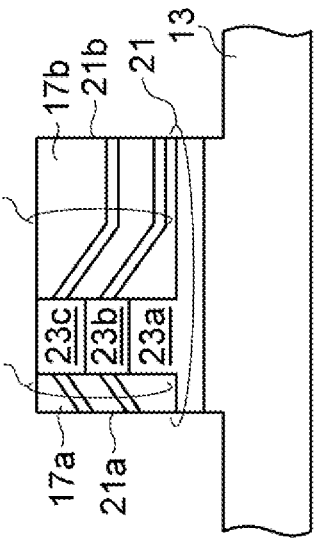

FIG. 5A is a plan view schematically illustrating the spot-size converter according to the example. FIG. 5B is a sectional view taken along line V-V illustrated in FIG. 5A and schematically illustrating a second mesa structure in the spot-size converter according to the example.

Exemplary Spot-size Converter
Support Body 13: Semi-insulating InP
First Mesa Structure 15
Lower Cladding Region 23a: n-type InP
Core Region 23b: AlGaInAs/AlGaInAs Quantum Well Structure
Upper Cladding Region 23c: Unintentionally Doped InP, p-type InP
Embedding Structure 17: InP/InGaAsP Multilayer Film As shown in FIG. 5B, in this example, the embedding structure 17 includes a lamination 25 that includes a first semiconductor layer and a second semiconductor layer that are laminated so as to have a refractive index that is larger than the refractive index of the upper cladding region 23c and that is smaller than the refractive index of the core region 23b. These semiconductor layers each have a thickness sufficiently smaller than the wavelength of propagating light and obtain an average refractive index given to the light by the refractive index of these semiconductor layers.

A waveguide region R0 includes a high-mesa waveguide for the Mach-Zehnder modulator. The high-mesa waveguide includes a first part 15a of the first mesa structure 15. The high-mesa waveguide has a mesa width (for example, a mesa width WMZI of 1.6 micrometers) that enables single-mode waveguiding. Light that runs through the waveguide region R0 has a small mode field diameter. The wavelength of the light is 1.55 micrometers.

Height of Waveguide Region R0: 3 micrometers

The waveguide region R1 provides a tapered waveguide. The tapered waveguide in region R1 includes the first part 15a. The waveguide region R1 changes the mode field diameter of light in the lateral direction and, specifically, enables an increase or a decrease in the mode field diameter in accordance with the propagation direction of light. The tapered waveguide has a waveguide width gradually changing (a width change in the waveguide width from one to the other of 1.6 micrometers and 3.5 micrometers) in the direction of a waveguide axis. The waveguide region R0 may be surrounded by an inorganic insulator, such as a silicon inorganic insulator, or an insulating film of an organic insulator (insulator having a low refractive index of 2 or less), such as a bisbenzocyclobutene (BCB) resin. If possible, a semiconductor of the waveguide region R0 is preferably in contact with an inorganic insulator without being covered with an organic insulator.

Length of Waveguide Region R1: 50 micrometers
Height of Waveguide Region R1: 3 micrometers A waveguide region R2 provides a waveguide that has a wide and constant width. The waveguide region R2 includes a first portion buried with the aforementioned low-refractive index insulator and a second portion buried with the InP/InGaAsP multilayer film of the embedding structure 17. The first portion of the waveguide in region R2 includes the first part 15a. The second portion of the waveguide in region R2 includes the second portion 15b. The embedding structure 17 has an average refractive index larger than the refractive index of the low-refractive index insulator and is capable of providing the waveguide region R2 with optical confinement looser than that of the low-refractive index insulator. Covering on a side surface of the waveguide region R2 changes from one toward the other of the low-refractive index insulator and the embedding structure 17. The loose optical confinement enables guided light to have a large mode field diameter. At the waveguide region R2, guided light has amplitude also at the embedding structure 17 outside the waveguide region R2. The change of the mode field diameter varies in accordance with the waveguide width of the waveguide region R2, and a large constant width becomes a small change in the mode field diameter. The small change in the mode field diameter reduces an optical loss.

Length of Waveguide Region R2: 20 micrometers

A waveguide region R3 provides a tapered waveguide. The tapered waveguide in the region R3 includes the second portion 15b. The tapered waveguide has a waveguide width gradually changing (a change in the waveguide width from one to the other of 1.6 micrometers and 3.5 micrometers) in the direction of the waveguide axis. The waveguide region R3 changes the mode field diameter of light in the lateral direction and, specifically, enables an increase or a decrease in the mode field diameter in accordance with the propagation direction of light. At the waveguide region R3, one side surface and the other side surface of the first mesa structure 15 are covered with the embedding structure 17 while the waveguide region R3 is in contact, at an upper surface thereof, with a low-refractive index medium. The waveguide region R3 enables guided light to have electric field amplitude not only at the first mesa structure 15 but also at the embedding structure 17. The waveguide region R3 is effective for changing the mode filed diameter of light in the lateral direction.

Length of Waveguide Region R3: 50 micrometers

A waveguide region R4 includes the second mesa structure 21. The second mesa structure 21 includes the first mesa structure 15 and the embedding structure 17. The embedding structure 17 includes the first region 17a and the second region 17b in which the first outer surface 17c and the second outer surface 17f are respectively embedded. At the waveguide region R4, the first mesa structure 15 has a mesa width that enables single-mode waveguiding, for example, a mesa width of 1.6 micrometers. The first region 17a on the first side-surface 15c has a first breadth WS1 in the normal direction of the first side-surface 15c. The second region 17b on the second side-surface 15d has a second breadth WS2 in the normal direction of the second side-surface 15d. At the waveguide region R4, the first breadth WS1 differs from the second breadth WS2 at a point on the waveguide axis in a direction from one end to the other end of the waveguide region R4, and the embedding structure 17 is asymmetrical on the left and right sides of the first mesa structure 15. The second breadth WS2 is considerably larger than the first breadth WS1, and a side surface of the second region 17b does not affect optical waveguiding of the waveguide region R4. The first breadth WS1 continuously changes along the waveguide axis in the direction from one end to the other end of the waveguide region R4 and shifts distribution of light that is guided through the first mesa structure 15 from one to the other of the first mesa structure 15 and the second region 17b.

Length of Waveguide Region R4: 50 micrometers
Height of Second Mesa Structure 21 of Waveguide Region R4: 4 micrometers A waveguide region R5 includes the second mesa structure 21. The second mesa structure 21 includes a first side-surface 21a and a second side-surface 21b. A gap (the width of the second mesa structure 21) between the first side-surface 21a and the second side-surface 21b provides a value that enables a wide mode field diameter. The second mesa structure 21 has a structure that includes the following two changes.

First Modification

The first breadth WS1 differs from the second breadth WS2 at a point on the waveguide axis in the direction from one end to the other end of the waveguide region R4, and the embedding structure 17 is asymmetrical on the left and right sides of the first mesa structure 15. In the second mesa structure 21, the first breadth WS1 of the first region 17a on the first side-surface 15c gradually decreases from the first breadth WS1 at the waveguide region R4, and the waveguide region R5 terminates the first region 17a. The first change provides, at the waveguide region R5, the first mesa structure 15 that has a constant width with asymmetry of the arrangement of the embedding structure 17.

Second Modification

The first mesa structure 15 has a waveguide width gradually changing (for example, a change in the waveguide width from one to the other of 1.6 micrometers and 0.8 micrometers) in the direction of the waveguide axis. A decrease in the width of the first mesa structure 15 decreases the width of the core region that has a large refractive index. The second change causes light at the waveguide region R5 to move from one to the other of the first mesa structure 15 that has the gradually changing waveguide width and the second region 17b of the embedding structure 17.

The second mesa structure 21 having a width that enables a wide mode field diameter includes the terminated first region 17a and the first mesa structure 15 having a decreased width. Therefore, pattern forming for the second mesa structure 21 is required for photolithography and etching in the formation of the termination and the decrease. The second mesa structure 21 has excellent mechanical strength.

Length of Waveguide Region R5: 100 micrometers
Height of Second Mesa Structure 21 of Waveguide Region R5: 4 micrometers
Width of Second Mesa Structure 21 of Waveguide Region R5: 3.0 micrometers A waveguide region R6 includes the second mesa structure 21. The width of the second mesa structure 21 is provided with a value that enables a wide mode field diameter. At the waveguide region R6, the first mesa structure 15 already has a small width (a width of less than 0.8 micrometers) compared with the width of the waveguide region R1. Specifically, the first mesa structure 15 additionally has a waveguide width gradually changing (for example, a change in the waveguide width from one to the other of 0.8 micrometers and 0.2 micrometers) in the direction of the waveguide axis. A decrease in the width of the first mesa structure 15 decreases the width of the core region that has a large refractive index. This change causes light at the waveguide region R6 to move from one to the other of the first mesa structure 15 having the gradually changing waveguide width and the second region 17b of the embedding structure 17. The first mesa structure 15 terminates at the waveguide region R6. This termination provides the entirety of the waveguide region R6 with the second region 17b of the embedding structure 17, as a result.

The second mesa structure 21 having a width that enables a wide mode field diameter includes the terminated first mesa structure 15. Therefore, pattern forming for the second mesa structure 21 is required for photolithography and etching in formation of the termination. The second mesa structure 21 has excellent mechanical strength.

The first mesa structure 15 having a waveguide width of 0.2 micrometers or less suddenly changes the waveguide mode at the second mesa structure 21. This change shifts distribution of light that is guided through the first mesa structure 15 from one to the other of the first mesa structure 15 and the second region 17b.

Length of Waveguide Region R6: 200 micrometers
Height of Second Mesa Structure 21 of Waveguide Region R6: 4 micrometers
Width of Second Mesa Structure 21 of Waveguide Region R6: 3.0 micrometers A waveguide region R7 includes the second mesa structure 21. The second mesa structure 21 includes the embedding structure 17.

Length of Waveguide Region R7: 50 micrometers
Height of Second Mesa Structure 21 of Waveguide Region R7: 4 micrometers
Width of Second Mesa Structure 21 of Waveguide Region R7: 3.0 micrometers A waveguide region R8 includes the second mesa structure 21. The second mesa structure 21 includes the embedding structure 17 having a waveguide width (a waveguide width gradually changing from one to the other of 3.0 micrometers and 3.5 micrometers) changing in the direction of the waveguide axis and has a tapered structure. The tapered structure is used to obtain a desired mode field diameter.

Length of Waveguide Region R8: 50 micrometers
Height of Second Mesa Structure 21 of Waveguide Region R8: 4 micrometers A waveguide region R9 includes the second mesa structure 21. The second mesa structure 21 includes the embedding structure 17 that has a constant waveguide width in the direction of the waveguide axis. The second mesa structure 21 that has a fixed width enables the spot-size converter 11 to be optically coupled favorably to an external waveguide, such as optical fibers.

Length of Waveguide Region R9: 20 micrometers
Height of Second Mesa Structure 21 of Waveguide Region R9: 4 micrometers
Width of Second Mesa Structure 21 of Waveguide region R9: 3.5 micrometers
Mode Field Diameter (Lateral/Vertical) of Waveguide Region R9: 3 micrometers/3 micrometers The spot-size converter according to Example 1 is coupled to optical fibers via a lens. The coupling loss is 0.5 dB or less, specifically, 0.2 dB.

EXAMPLE 2

FIG. 6A is a plan view schematically illustrating a spot-size converter according to an example. FIG. 6B is a sectional view schematically illustrating a second mesa structure in the spot-size converter according to the example.
Exemplary Spot-size Converter made of Semiconductor
Support Body 13: Semi-insulating InP
First Mesa Structure 15
Lower Cladding Region 23a: n-type InP
Core Region 23b: AlGaInAs/AlGaInAs Quantum Well Structure
Upper Cladding Region 23c: Unintentionally Doped InP, p-type InP
Embedding Structure 17: InP/InGaAsP Multilayer Film
Lower Region 27: InP/InGaAsP Multilayer Film The embedding structure 17 may include the lamination 25 including the first semiconductor layer and the second semiconductor layer that are laminated so as to have a refractive index that is larger than the refractive index of the upper cladding region 23c and that is smaller than the refractive index of the core region 23b.

The lower region 27 may include a lamination 35 including a first semiconductor layer and a second semiconductor layer that are laminated so as to have a refractive index that is larger than the refractive index of the upper cladding region 23c and that is smaller than the refractive index of the core region 23b. The lower region 27 is capable of reducing a leak from the second mesa structure 21 to the support body. The lower region 27 is effective for increasing the mode field diameter in the vertical direction.

Exemplary Waveguide Region

The waveguide region R0 includes a high-mesa for the Mach-Zehnder modulator 33. Light that runs through the waveguide region R0 has a small mode field diameter.
Height of Waveguide Region R0: 3 micrometers
Length of Waveguide Region R1: 50 micrometers
Height of Waveguide Region R1: 3 micrometers
Length of Waveguide Region R2: 20 micrometers
Length of Waveguide Region R3: 50 micrometers
Length of Waveguide Region R4: 50 micrometers
Height of Second Mesa Structure 21 of Waveguide Region R4: 4 micrometers
Length of Waveguide Region R5: 100 micrometers
Height of Second Mesa Structure 21 of Waveguide Region R5: 4 micrometers
Width of Second Mesa Structure 21 of Waveguide Region R5: 3.0 micrometers
Length of Waveguide Region R6: 200 micrometers
Height of Second Mesa Structure 21 of Waveguide Region R6: 4 micrometers
Width of Second Mesa Structure 21 of Waveguide Region R6: 3.0 micrometers
Length of Waveguide Region R7: 50 micrometers
Height of Second Mesa Structure 21 of Waveguide Region R7: 4 micrometers
Width of Second Mesa Structure 21 of Waveguide Region R7: 3.0 micrometers
Length of Waveguide Region R8: 50 micrometers
Height of Second Mesa Structure 21 of Waveguide Region R8: 4 micrometers
Length of Waveguide Region R9: 20 micrometers
Height of Second Mesa Structure 21 of Waveguide region R9: 4 micrometers
Width of Second Mesa Structure 21 of Waveguide Region R9: 3.5 micrometers
Mode Field Diameter (Lateral/Vertical) of Waveguide Region R9: 3 micrometers/4 micrometers The spot-size converter according to Example 2 is coupled to optical fibers via a lens. The coupling loss is 0.5 dB or less, specifically, 0.2 dB.

EXAMPLE 3

Exemplary Spot-size Converter
Support Body 13: Semi-insulating GaAs
First Mesa Structure 15
Lower Cladding Region 23a: n-type GaAs
Core Region 23b: GaAs/AlGaAs Quantum Well Structure
Upper Cladding Region 23c: Unintentionally Doped GaAs, p-type GaAs
Embedding Structure 17: GaAs/AlGaAs Multilayer Film FIG. 7, FIG. 8, FIG. 9, FIG. 10, FIG. 11, and FIG. 12 each schematically illustrate a main step of the method of manufacturing the spot-size converter according to the embodiment.

Figure 7:
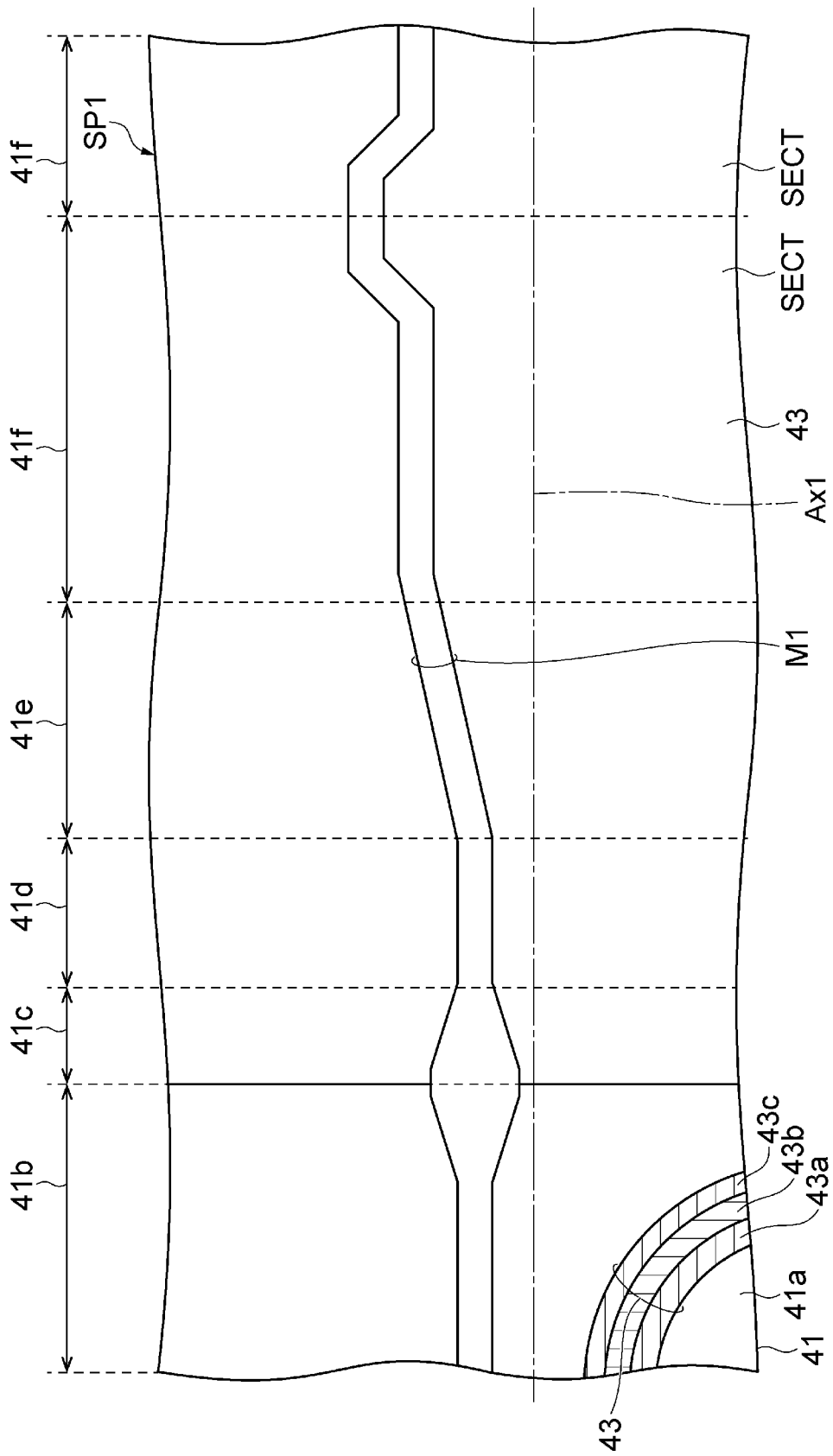
FIG. 7 schematically illustrates a main step of a method of manufacturing the spot-size converter according to an embodiment.

As illustrated in FIG. 7, a first product SP1 is prepared. In this step, the first product SP1 includes a substrate 41 for crystal growth and a lamination structure 43 for a waveguide structure. The substrate 41 includes a main surface 41a that includes an arrangement of an element section SECT. The main surface 41a includes a first area 41b, a second area 41c, a third area 41d, a fourth area 41e, and a fifth area 41f that are arranged in the direction of the waveguide axis Ax1 at the element section SECT. The lamination structure 43 is loaded on the main surface 41a of the substrate 41. Specifically, the lamination structure 43 includes semiconductor films (43a, 43b, and 43c) for an InP lower cladding layer, a MQW core layer of AlGaInAs/AlGaInAs, and an InP upper cladding layer, the semiconductor films being subsequently grown on an InP wafer by, for example, a metal organic chemical vapor deposition (MOCVD) method.

A first mask M1 is formed on the first product SP1 by deposition and photolithography. The first mask M1 includes a stripe pattern. The first mask M1 includes a silicon inorganic insulating film of, for example, a silicon oxide.

Figure 8:
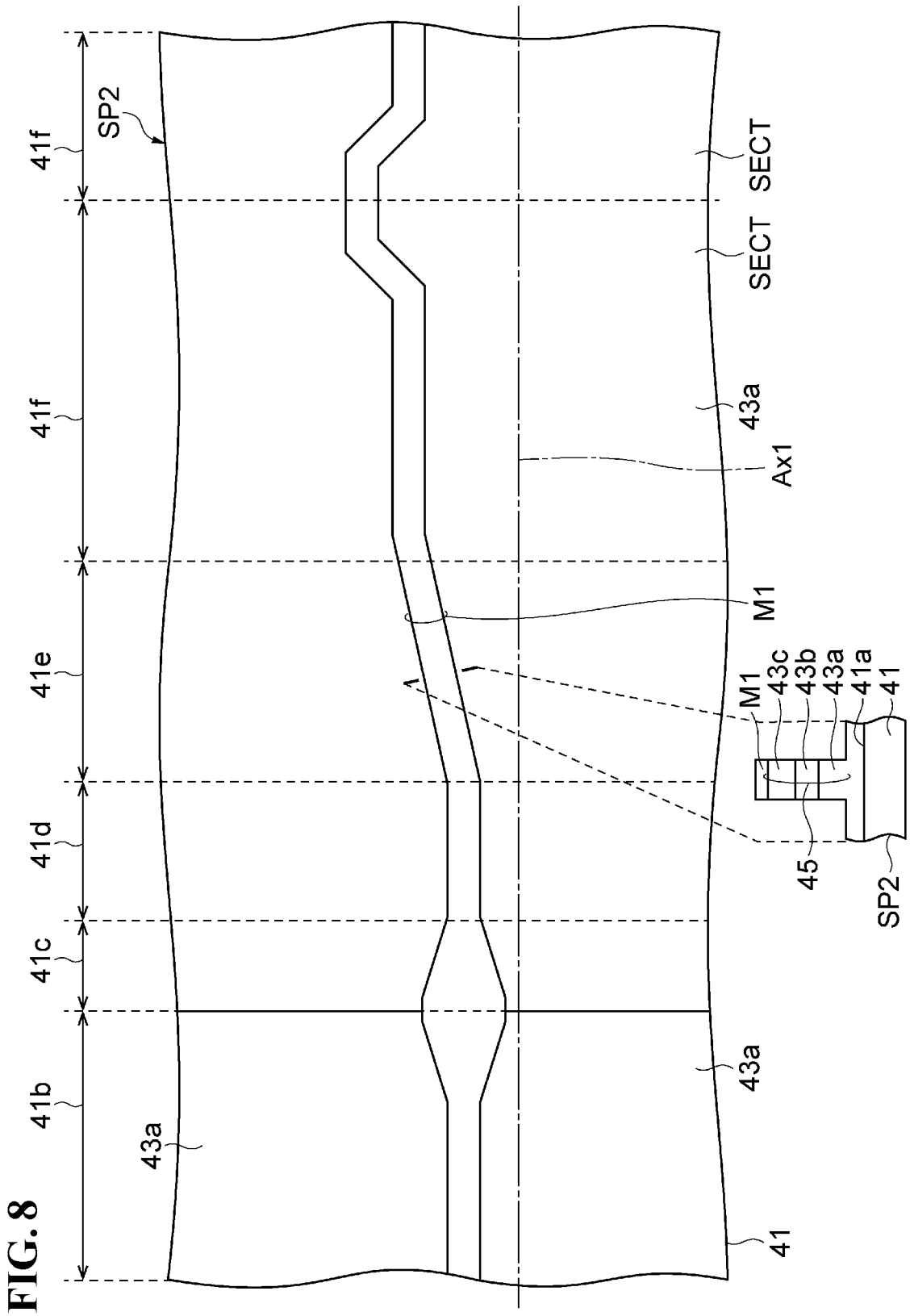
FIG. 8 schematically illustrates a main step of the method of manufacturing the spot-size converter according to the embodiment.

As illustrated in FIG. 8, a second product SP2 is formed by etching the first product SP1 with use of the first mask M1. The second product SP2 includes a stripe mesa 45 on the first area 41b, the second area 41c, the third area 41d, the fourth area 41e, and the fifth area 41f. The stripe mesa 45 includes a first side-surface 45a and a second side-surface 45b. Specifically, the stripe mesa 45 includes the semiconductor films (43a, 43b, and 43c) for the InP lower cladding layer, the AlGaInAs/AlGaInAs core MQW layer, and the InP upper cladding layer.

Figure 9:
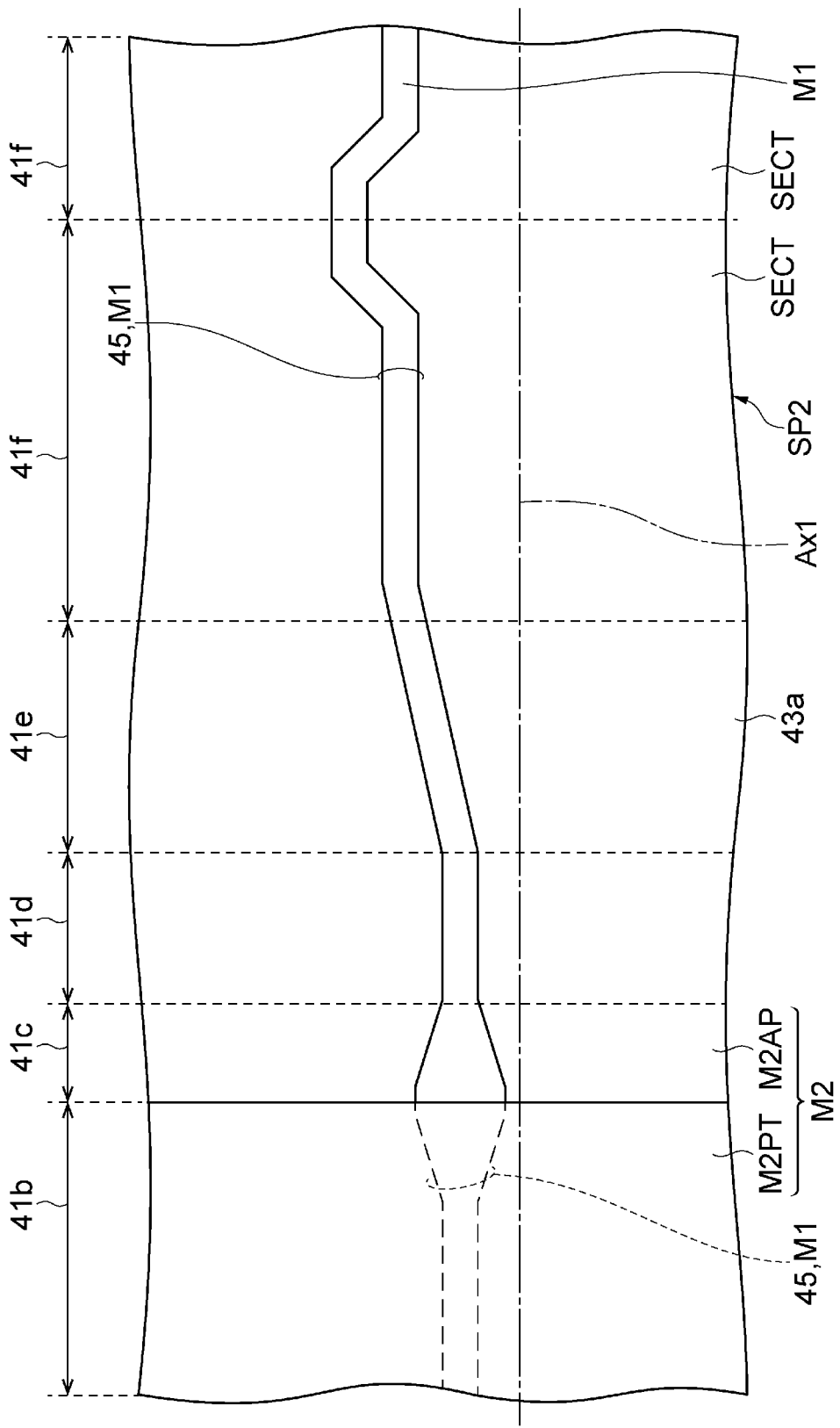
FIG. 9 schematically illustrates a main step of the method of manufacturing the spot-size converter according to the embodiment.

As illustrated in FIG. 9, a second mask M2 is formed on the second product SP2. The second mask M2 includes a stripe pattern M2PT covering the first area 41b and includes an opening M2AP on the second area 41c, the third area 41d, the fourth area 41e, and the fifth area 41f.

Figure 10:
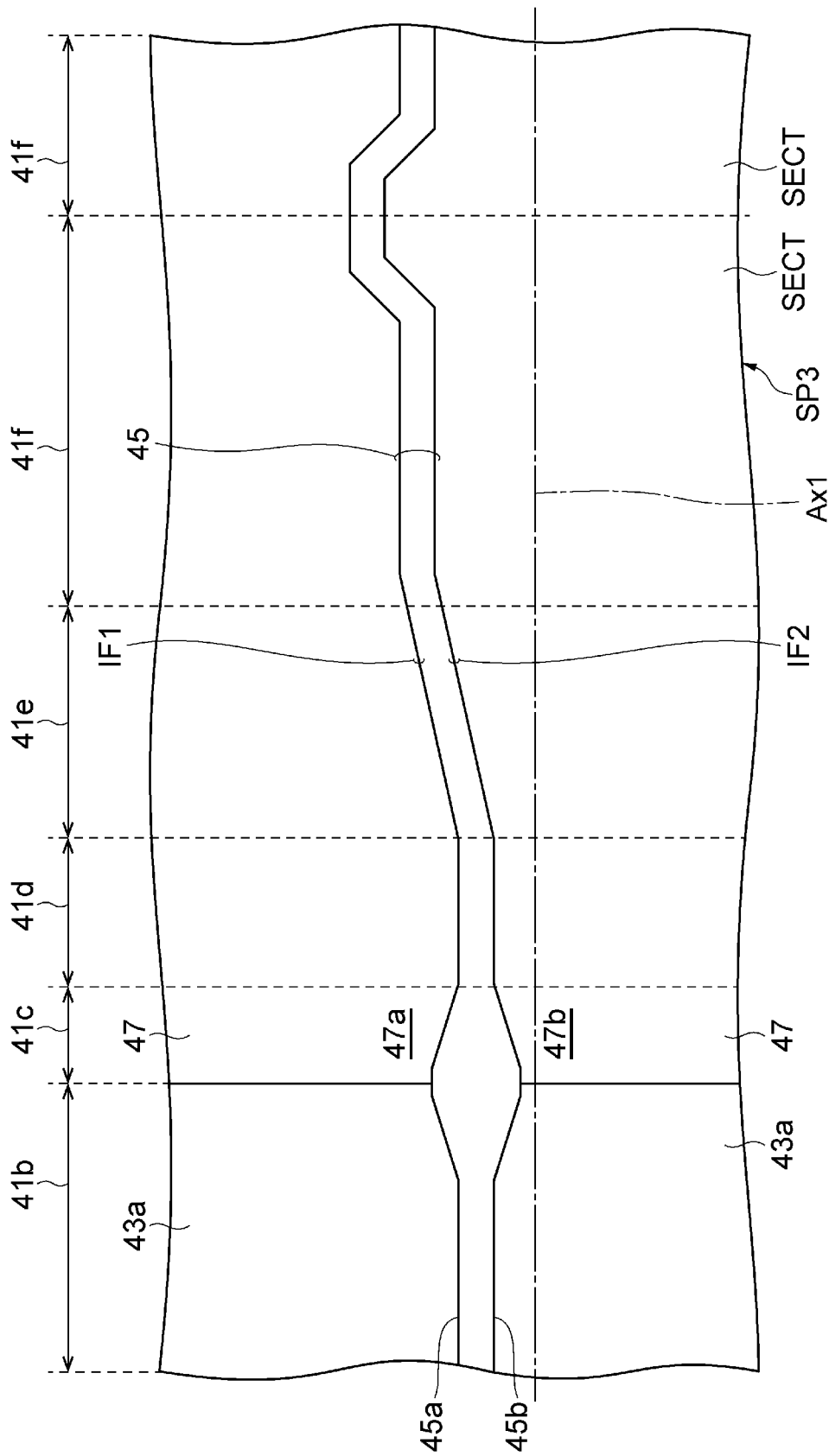
FIG. 10 schematically illustrates a main step of the method of manufacturing the spot-size converter according to the embodiment.

As illustrated in FIG. 10, an embedding region 47 is formed on the second product SP2 with use of the first mask M1 and the second mask M2. The embedding region 47 includes a first region 47a and a second region 47b. The first region 47a and the second region 47b of the embedding region 47 are grown on the first side-surface 45a and the second side-surface 45b of the stripe mesa 45 of the second product SP2, respectively, and form, on the second area 41c, the third area 41d, the fourth area 41e, and the fifth area 41f, a first interface IF1 and a second interface IF2, respectively, with respect to the stripe mesa 45. On the first area 41b, the first side-surface 45a and the second side-surface 45b of the stripe mesa 45 remain. Specifically, an InP/InGaAsP multilayer film is formed on the second product SP2 through selective growth, and the stripe mesa 45 is embedded in an area from the second area 41c to the fifth area 41f. A third product SP3 is formed by removing the first mask M1 and the second mask M2 after the embedding region 47 is formed.

Figure 11:
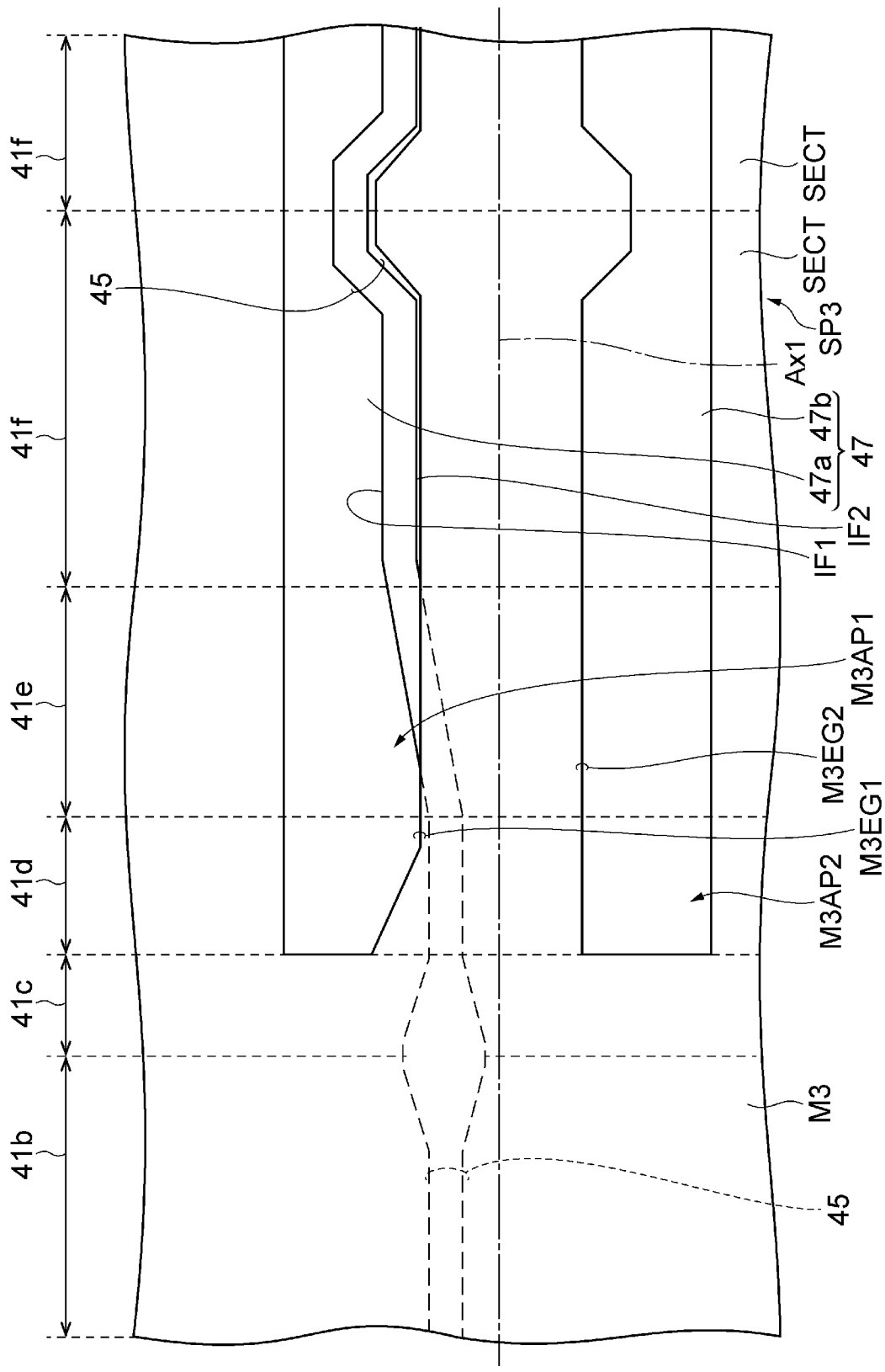
FIG. 11 schematically illustrates a main step of the method of manufacturing the spot-size converter according to the embodiment.

As illustrated FIG. 11, a third mask M3 is formed on the third product SP3 by photolithography. The third mask M3 includes a pattern covering the first area 41b and the second area 41c and includes a first opening M3AP1 and a second opening M3AP2 on an area from the third area 41d to the fifth area 41f. The second opening M3AP2 is away from the first opening M3AP1. The first opening M3AP1 is located on the stripe mesa 45, the first region 47a, and the second region 47b and intersects the first interface IF1, and, if necessary, also intersects the second interface IF2. The first opening M3AP1 includes an edge M3EG1 intersecting the first interface IF1 with an acute angle (TH1) formed therebetween. In the present example, the edge M3EG1 of the first opening M3AP1 intersects the second interface IF2 with an acute angle (TH2) formed therebetween. The second opening M3AP2 is located on the second region 47b, is away from the first region 47a and the stripe mesa 45, and does not intersect the first interface IF1 or the second interface IF2. An edge M3EG2 of the second opening M3AP2 is located on the second region 47b.

A gap between the first opening M3AP1 and the second opening M3AP2 provides a waveguide width (the already described width of the second mesa structure 21) that enables a large spot-size diameter. The width of the stripe mesa 45 provides a waveguide width (the already described width of the first mesa structure 15) that enables a small spot-size diameter.

Figure 12:
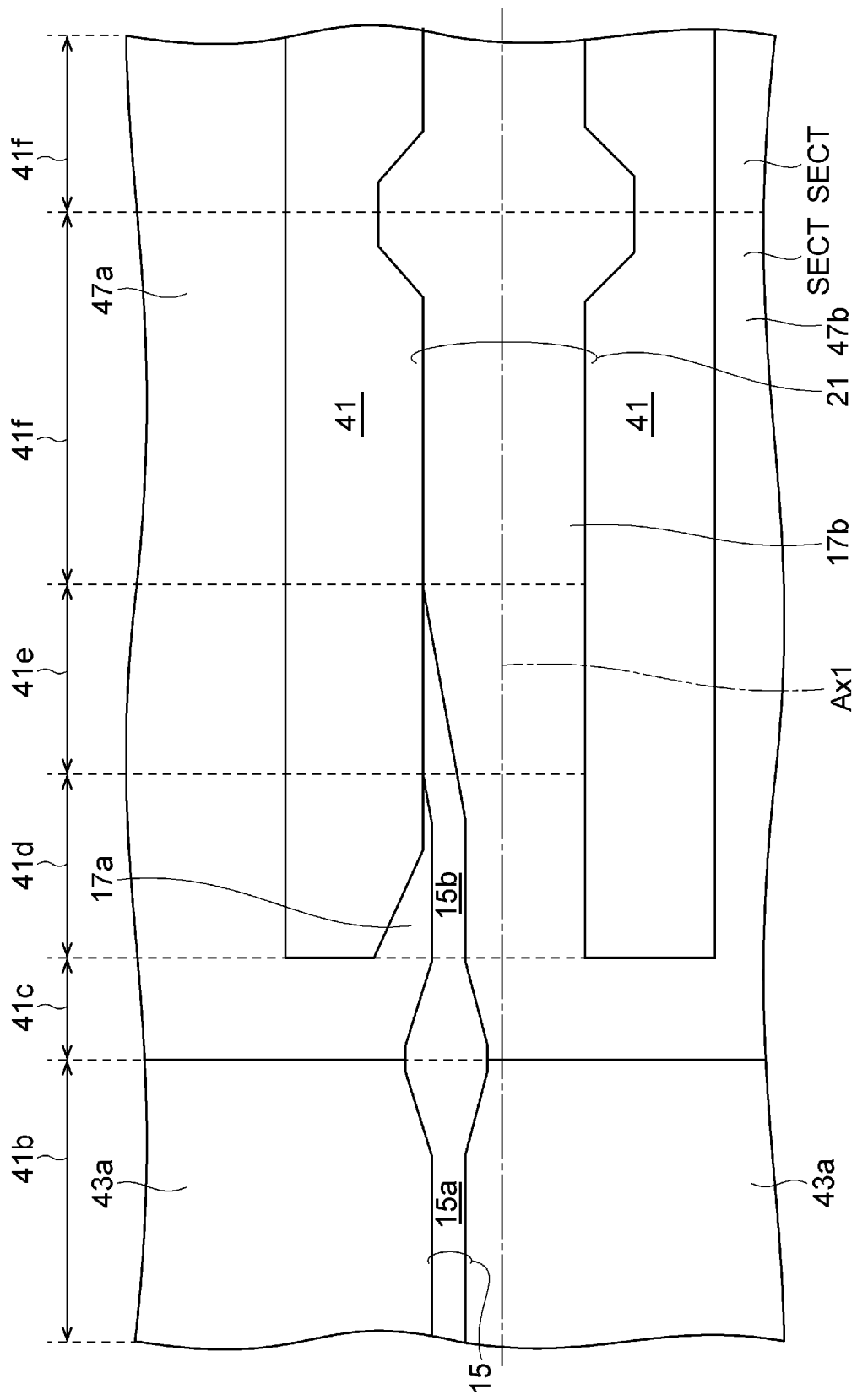
FIG. 12 schematically illustrates a main step of the method of manufacturing the spot-size converter according to the embodiment.

As illustrated in FIG. 12, the first mesa structure 15 is formed from the stripe mesa 45 and the embedding structure 17 is formed from the embedding region 47 by etching the third product SP3 with use of the third mask M3.

The thus manufactured first mesa structure 15 includes the first part 15a at the first area 41b of the element section SECT and includes the second part 15b at the second area 41c, the third area 41d, and the fourth area 41e of the element section SECT.

The thus manufactured embedding structure 17 includes the first region 17a and the second region 17b at the second area 41c and the third area 41d of the element section SECT. The first side-surface 15c and the second side-surface 15d of the second part 15b of the first mesa structure 15 are embedded in the first region 17a and the second region 17b, respectively.

Through these steps, the spot-size converter is completed. Next, if necessary, an electrode for the Mach-Zehnder modulator is formed.

According to the method of manufacturing the spot-size converter 11, the third product SP3 is formed, the third product SP3 including the stripe mesa 45 and the embedding region 47 that includes the first region 47a and the second region 47b forming a respective one of the first interface IF1 and the second interface IF2 on the first side-surface 45a and the second side-surface 45b of the stripe mesa 45, respectively, and the third product SP3 is etched using the third mask M3 that includes the first opening M3AP1 and the second opening M3AP2 that is away from the first opening M3AP1, the first opening M3AP1 intersecting the first interface IF1 and the second interface IF2 of the third product SP3. The third product SP3 enables the second part 15b of the first mesa structure 15 to include, at the fourth area 41e, a portion that has a width gradually decreasing in the direction of the waveguide axis Ax1. The first region 17a of the embedding structure 17 extends along the first side-surface 15c of the second part 15b of the first mesa structure 15 and terminates at one of the third area 41d and the fourth area 41e. The second part 15b of the first mesa structure 15 may terminate at the fourth area 41e. The second region 17b of the embedding structure 17 extends along the second side-surface 15d of the second part 15b of the first mesa structure 15 and is disposed at the fifth area 41f.

A principle of the present invention is described above in a suitable embodiment with reference to the drawings; however, it is recognized by a person skilled in the art that the present invention can be changed in terms of arrangements and details without deviating from such a principle. The present invention is not limited to the specific configurations disclosed in the present embodiment. Accordingly, a right is claimed for all of modifications and changes derived from the claims and the scope of the spirit of the claims.

What is claimed is:

1. A spot-size converter comprising:
   a support body that includes a main surface including a first area, a second area, a third area, a fourth area, and a fifth area that are arranged in a direction of a waveguide axis;
   a mesa structure that includes a first part on the first area of the support body and includes a second part on the second area, the third area, and the fourth area of the support body; and
   an embedding structure that includes a first region and a second region in which a first side-surface and a second side-surface of the second part of the mesa structure are respectively embedded and that is disposed on the second area, the third area, the fourth area, and the fifth area of the support body,
   wherein the first part and the second part of the mesa structure include a lower cladding region, a core region, and an upper cladding region,
   wherein the second part of the mesa structure includes, on the fourth area of the support body, a portion that has a width gradually decreasing in a direction from the third area toward the fifth area,
   wherein the first region of the embedding structure extends along the first side-surface of the second part of the mesa structure and terminates at one of the third area and the fourth area, and
   wherein the second region of the embedding structure extends along the second side-surface of the second part of the mesa structure and is disposed on the fifth area.

2. The spot-size converter according to claim 1, wherein the first part of the mesa structure has, on the first area of the support body, a first width that enables single-mode waveguiding, and
   wherein the second region of the embedding structure has, on the third area, the fourth area, and the fifth area of the support body, a width larger than the first width.

3. The spot-size converter according to claim 1, wherein the first region of the embedding structure includes, on at least one of the third area and the fourth area, a portion that has a width gradually decreasing in the direction of the waveguide axis.

4. The spot-size converter according to claim 1, wherein the embedding structure includes a lamination of a plurality of semiconductor layers that are laminated so as to have a refractive index that is larger than a refractive index of the upper cladding region and that is smaller than a refractive index of the core region.

5. The spot-size converter according to claim 1, further comprising:
   a confining region disposed on the first area, the second area, the third area, the fourth area, and the fifth area of the support body,
   wherein, on the confining region, the mesa structure and the embedding structure are loaded, and
   wherein the confining region has a refractive index that is larger than a refractive index of the upper cladding region and that is smaller than a refractive index of the core region.

6. A method of manufacturing a spot-size converter comprising:
   a step of preparing a first product that includes a substrate and that includes, on the substrate, a lamination structure for a waveguide structure, the substrate including a main surface that includes a first area, a second area, a third area, a fourth area, and a fifth area that are arranged at one element section in a direction of a waveguide axis;
   a step of forming a first mask on the first product, the first mask including a stripe pattern;
   a step of forming a second product by etching the first product with use of the first mask, the second product including a stripe mesa on the first area, the second area, the third area, and the fourth area;
   a step of forming a second mask on the second product, the second mask covering the first area;
   a step of forming a third product by forming a deposit with use of the first mask and the second mask, the deposit including a first region and a second region that form a respective one of a first interface and a second interface on a first side-surface and a second side-surface of the stripe mesa of the second product, respectively;
   a step of removing the first mask and the second mask after forming the deposit;
   a step of forming a third mask on the third product, the third mask including a first opening and a second opening that is away from the first opening, the first opening intersecting the first interface and the second interface; and
   a step of forming a mesa structure and an embedding structure by etching the third product with use of the third mask,
   wherein the mesa structure includes a first part at the first area and includes a second part at the second area, the third area, and the fourth area of the substrate, and
   wherein the embedding structure includes a first region and a second region in which a first side-surface and a second side-surface of the second part of the mesa structure are respectively embedded, and the embedding structure is disposed at the second area, the third area, the fourth area, and the fifth area of the substrate.

* * * * *